Patented Jan. 31, 1950

2,496,099

UNITED STATES PATENT OFFICE 2,496,099

CENTER LOCATOR

Frank Leto, Los Angeles, Calif.

Application August 27, 1945, Serial No. 612,814

1 Claim. (Cl. 33—1)

My invention relates to a center locator and more particularly to a center locator for use in machining irregularly shaped bodies.

It is often necessary to bore holes or to make turnings on irregularly shaped pieces of material in a lathe or other turning device. When such an operation is necessary, the piece must be placed in the chuck of the lathe and the center of the desired hole or portion to be turned located accurately with the center of the spindle of the lathe. In previous practice this has been done by laying out a center mark on the object to be machined and then locating this center in relation to the cutting tool by rotating the lathe spindle while a tool was held substantially at the center mark. Of course, errors in sight would cause errors in locating the center.

My invention comprises a simple device which is attached to the object to be machined, preferably by magnetism, and which has an outer surface which is circular and machined to an exact hairline center point on the device. When my center locator is either clamped or fastened to the object machined by magnetism and the hairline centered over the center of the point to be worked, the tool rest of the lathe can be placed against the outer periphery of my locator; and when the spindle is turned, the tool will touch the outer periphery at all times during the revolution of the spindle. If it does not, the machinist will know that he is not on true center and will adjust the object in the chuck.

With these objects and advantages in view, the following specification sets forth the preferred embodiments of my invention.

Figure 1:
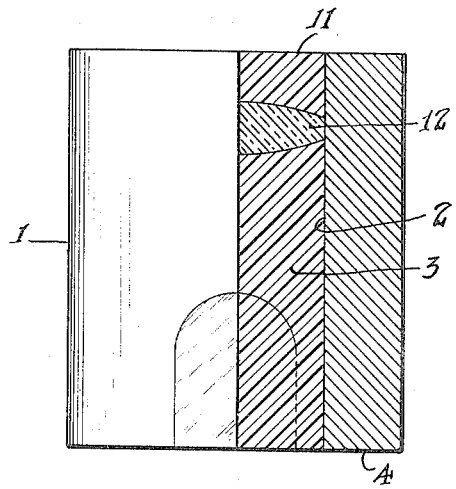
Figure 1 is a side elevation partially in cross section of my center locator.
Figure 2:
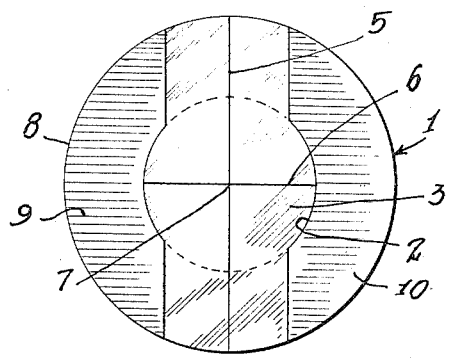
Figure 2 is a bottom plan view.

A center locator constructed in accordance with my invention comprises a cylindrical body 1 preferably of magnetic material which has a central bore 2 bored therein. A plug or core 3 of clear plastic or other transparent substance is forced into this center bore 2 and permanently affixed there. The bottom face 4 of the body and the core 3 are then faced off to a true surface. Located on the bottom surface 4 and embedded in the core 3 are cross-hairs 5 and 6 which form a center point 7. The outer periphery 8 of the body 1 is turned in a lathe so that its surface is perpendicular to the surface 4 and the periphery has a true center on the point 7.

When an irregularly shaped object is placed in the lathe chuck, it is first surfaced to give a surface upon which the face 4 can fit. If the object to be machined is a magnetic material such as iron or steel, my center locator is preferably formed as a magnet and the body 1 has the depending legs 9 and 10 which act as the two poles of the magnet. With this construction, the device is merely placed upon the surface of the work and held thereby the magnet. The center point 7 is located directly on the previously marked center to be drilled or machined by locating through the transparent core from the upper or outer end 11. When my center locator is thus positioned, any kind of a tool can be placed in the tool rest of the lathe and allowed to ride on the outer periphery 8; and when it touches the outer periphery throughout its entire circumference, the machinist knows that the center of the work is in the exact center of the lathe spindle and he can either bore or turn on the surface a truly centered machine operation.

On non-magnetic materials any kind of clamping device which would clamp my center locator on the surface of the object to be machined would be usable and the center located exactly as hereinbefore.

To provide better vision, the core 3 can have a lens 12 embedded either at the outer end or in the center and surrounded with a transparency. By the use of this lens, the cross hairs 5 and 6 are enlarged and the center point 7 is clearer and easier to position upon the center of the work.

While I have described the preferred embodiments of my invention, I am not to be limited to any of the details set forth herein, except as defined in the appended claim.

I claim:

In a center locator, a body formed of magnetic material, said body being substantially cylindrical, a transparent core affixed in said body, said body having one end cut away to form the poles of a magnet, said pole end being perpendicular to the outer periphery of said body, and center indicating means carried on the end of said core adjacent to said poles.

FRANK LETO.

REFERENCES CITED

The following references are of record in the file of this patent:

UNITED STATES PATENTS

| Number | Name | Date |
|---|---|---|
| 354,740 | Rogers | Dec. 21, 1886 |
| 456,553 | Carr | July 28, 1891 |
| 803,435 | Saegmuller | Oct. 31, 1905 |
| 1,339,919 | Cobb | May 11, 1920 |
| 1,933,880 | Tihenko | Nov. 7, 1933 |
| 2,366,430 | Benton | Jan. 2, 1945 |